Oct. 17, 1967     G. T. LYON     3,346,935
METHOD OF MAKING A FLUID PRESSURE COUPLING
Filed Sept. 27, 1962     2 Sheets-Sheet 1
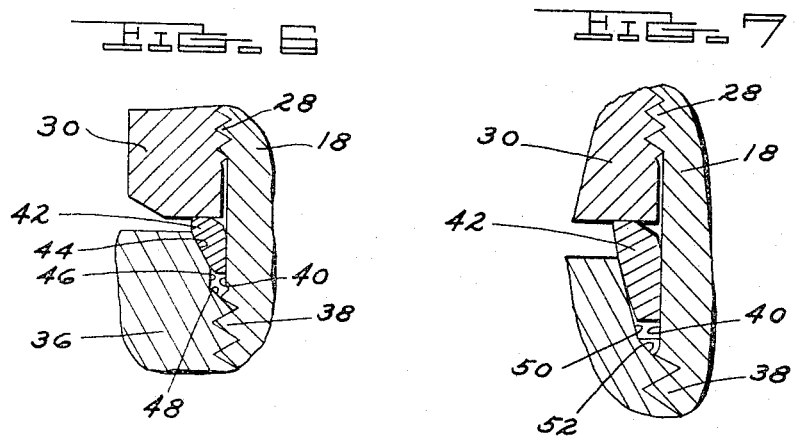
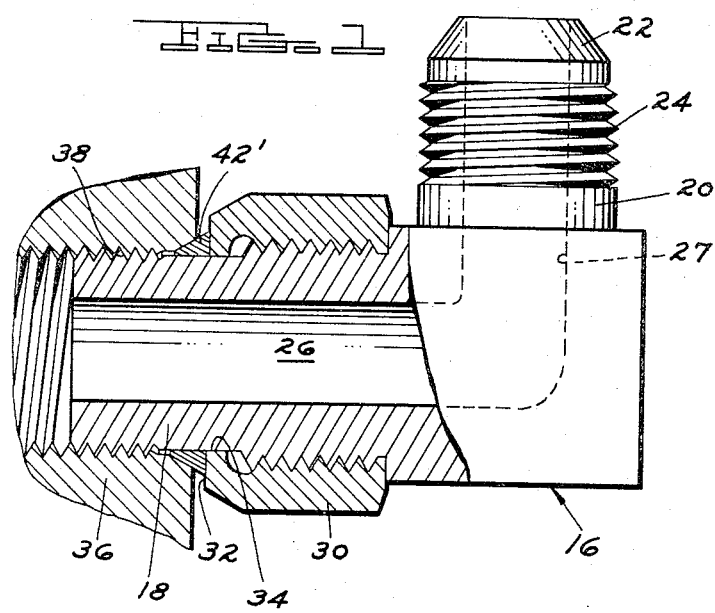
INVENTOR.
GILBERT T. LYON
BY
Burton & Parker
ATTORNEYS

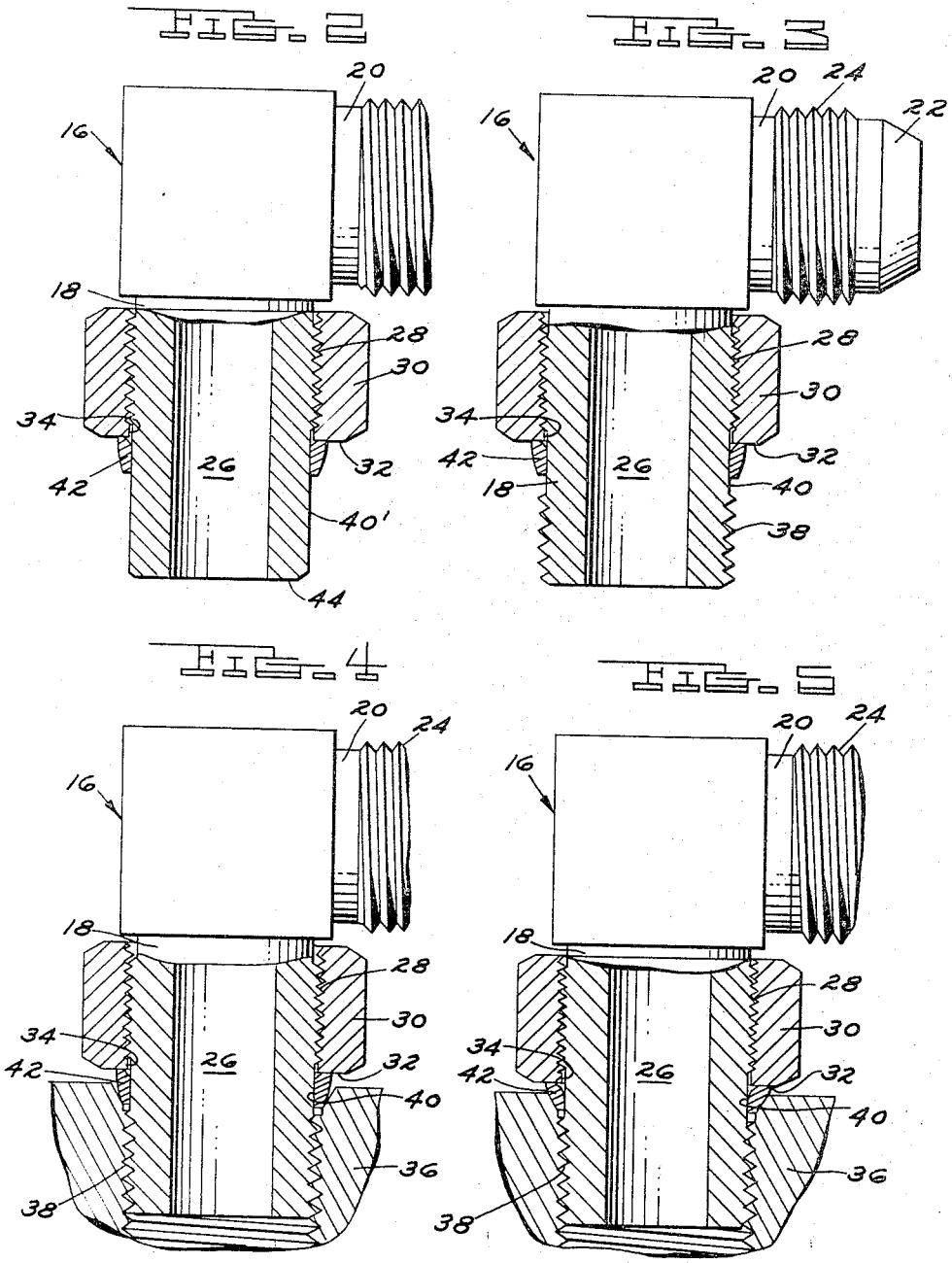

United States Patent Office 3,346,935
Patented Oct. 17, 1967

3,346,935
METHOD OF MAKING A FLUID
PRESSURE COUPLING
Gilbert T. Lyon, Royal Oak, Mich., assignor to L & L Manufacturing Company, Warren, Mich., a corporation of Michigan
Filed Sept. 27, 1962, Ser. No. 226,510
2 Claims. (Cl. 29—157)

This invention relates to the provision of a fluid pressure coupling for an internally threaded port such as in an hydraulically operated unit or in a fluid line, which port has an outwardly flared sealing seat at the entrance, and more particularly, to the provision of a tubular coupling member having a sealing ring positioned surrounding the tube, wherein the sealing ring is made of a relatively inflexible material and is slidably received over one end of the tube prior to the forming of the tubular threaded length, with the ring being captive on the tube once the threads have been formed.

It is therefore the general object of the invention to provide a method of making a fluid pressure coupling comprising a tube, a sealing ring encircling an intermediate portion of the tube, and a threaded length adjacent one end of the tube, wherein the ring is positioned on the tube prior to the formation of said threaded length, with such threads being formed to provide a thread crest diameter larger than the normal diameter of the tube and the internal diameter of the sealing ring.

Another object of the invention is the provision of a method of making a fluid pressure coupling including a sealing ring entrapped between a tubular member and a flared port entrance to form a fluid tight seal therebetween, wherein the sealing ring is constructed of a relatively inflexible material such as a hardened metal, ceramic, or resin impregnated fiber material.

A further object of the invention is the provision of a method of making a fluid pressure coupling having a tubular member exhibiting a threaded length engageable with an internally threaded port wherein the tube threads are formed by rolling, whereby the wall thickness of the tube is substantially greater than previous coupling designs, enabling the fitting to withstand higher temperatures and pressures.

A specific object of the invention is the provision of a method of making a fluid pressure coupling for use in an internally threaded port having an outwardly flared sealing seat at the entrance thereof comprising a tubular member and a sealing ring wherein the sealing ring is made of a comparatively hard, inflexible material and the tubular member is provided with a threaded length of increased strength due to the threads being formed thereon by a cold working process after installation of the ring thereon.

One form of tube coupling or fluid pressure fitting in present use incorporates a tube having a threaded length and an annular undercut portion, and a sealing ring which is normally of sufficient diameter to be slidably receivable over the threaded length of the tube. To provide a fluid tight seal within a member having a port therein with a flared entrance, such sealing ring must be swaged radially inwardly about the undercut portion of the tube. There are many materials of high strength and durability that are well suited for use as sealing rings in such fluid pressure couplings, but which are also characteristically inflexible so as to preclude their use in fittings wherein the ring must be swaged about a tubular member. Thus the range of materials available for use in these fittings has been restricted to relatively ductile materials which are readily swagable without fracture or undesirable deformation. The instant invention makes the use of harder, stronger sealing ring materials possible by providing a fitting and a method of making the fitting wherein the ring need not be pre-swaged or shrunk about the annular sealing surface of the tubular member.

Utilizing the instant invention, the external diameter of the tube encircled by the ring and the internal diameter of the ring may be determined and machined before assembly of the tube and ring, and hence the clearance between the two members may be held to very close tolerances, with the ring closely fitting the tube in sliding engagement. There is thus very little clearance between the two members when assembled, and hence only slight deformation of the sealing ring to provide an effective seal when the fitting is tightened into the port. Where the ring is radially compressed, as by swaging or other cold forming operation to fit the tube, as in prior constructions, the desired small clearance between the tube and ring is quite difficult to achieve. In such a construction the sealing ring must be evenly swaged throughout its entire circumference after assembly about the tube, whereas in the construction embodying the invention shown herein the ring can be easily and conveniently machined prior to assembly, insuring a close tolerance fit.

A further object of the invention is the provision of a method of making a fluid pressure coupling comprising a tubular fluid conducting member and a substantially inflexible sealing ring, which coupling will provide an effective seal with a port member having an internally threaded length and a flared port, for example a standard UN (universal) or a standard SAE port.

Other objects, advantages and meritorious features will more fully appear from the specification, claims and accompanying drawings, wherein:

FIG. 1 is a cross sectional view of a device embodying the invention showing the coupling assembled within the port;

FIG. 2 is a cross sectional view of the coupling showing the tube and ring assembled prior to forming the tube threads;

FIG. 3 is a view similar to FIG. 2 with the threads formed on the tube;

FIG. 4 is a view showing the coupling of FIG. 3 inserted into the port;

FIG. 5 is a view similar to FIG. 4 showing the coupling in final installed condition;

FIG. 6 is an enlarged cross sectional view of a portion of the left side of FIG. 5 showing the ring in sealing position in an UN port; and FIG. 7 is a view similar to FIG. 6 showing the ring in sealing position in an SAE port.

Referring now to the drawings, there is shown a coupling embodying the invention including a tubular member 16 having a longitudinally extending portion 18 and a transversely extending portion 20. The transversely extending portion has an inwardly tapering conical extremity 22 and an externally threaded length 24 adapted to be connected to a suitable fluid pressure line (not shown). A longitudinal fluid conducting passage 26 opens through the inner end of member 16, and a transverse passage 27 (see FIG. 1) communicates therewith and opens through the conical extremity 22. A coupling of the type shown is generally referred to as a transverse tube coupling or fitting. It is obvious however, that if so desired the coupling could be constructed having a member provided with a longitudinal passage such as shown at 26 only, commonly referred to as a straight fitting, although such is not shown in the drawings.

The longitudinal portion 18 of member 16 may be provided adjacent its inner end with an externally threaded length 28, upon which there is threadedly engaged a lock nut 30, having an exterior wrench-engaging configuration. The inner face 32 of the nut 30 is flat and smooth, with a cylindrical skirt portion 34 at the inner end of the nut threads closely encircling the tube 18. The provision of such lock nut enables the fitting to be positioned at any desired angle of rotation with respect to the port, as described more fully hereinafter.

The coupling is adapted to be received within an internally threaded port 36. The inner end of tube portion 18 is thus provided with an externally threaded length 38. Intermediate the threaded lengths 28 and 38 on the tube there is provided a smooth cylindrical surface 40 encircling which there is positioned a sealing ring 42. The thread crest diameter of the threaded length 38 is greater than the diameter of cylindrical portion 40 and the internal diameter of ring 42. Thus the sealing ring 42 is held captive on member 16 between the lock nut 30 and the threads 38.

The fluid pressure coupling disclosed herein is particularly designed to incorporate a ring 42 made out of a substantially inflexible material such as a relatively hard metal, a ceramic material, a resin impregnated fiber laminate, or the like. Such materials are able to withstand extremely high pressure and temperatures without damage, and thus may be advantageously employed as sealing rings. However, they are also more brittle and inflexible than the materials heretofore used to make sealing rings for fluid pressure fittings, making it impossible as a practical matter to utilize these materials in a fitting wherein the sealing ring is swaged or shrunk about the cylindrical portion of the tube.

In the manufacture of the tubular member 16, the longitudinal portion 18 exhibits a smooth cylindrical portion 40' extending from its inner end 44 to the threaded length 28 as shown in FIG. 2. With the threads 28 formed and the lock nut 30 mounted thereon, the sealing ring 42 is slipped over the inner end of the tube and is positioned adjacent the nut (FIG. 2). The internal diameter of the sealing ring 42 is machined to a very close tolerance to be received over the cylindrical portion 40' of the tube, and hence only a very minute deformation of the ring is necessary to provide a fluid tight seal therebetween when the fitting is assembled in a port. The threaded length 38 is then formed on the tube between the ring 42 and the tube end 44. The threads 38 are commonly known as rolled threads, being forrmed by a rolling operation rather than by a cutting operation as is ordinarily employed. By rolling the threads 38, the thread crest diameter is greater than the original diameter of the tube as at 40' (FIG. 2). Thus the ring 42 may be slidably received over the unthreaded portion, and the threads then rolled, holding the ring captive on the fitting.

In order to provide satisfactory rolled threads, the cylindrical blank (as at 40') must be held to close tolerance, say about plus or minus one thousandth of an inch. The internal diameter of the sealing ring 42 may then be machined to a close tolerance to be slidably received over the blank, say from 0.001 to 0.002 over the diameter of the blank. If a ring is provided which must be swaged or shrunk over the portion 40 (FIG. 3), it is difficult, if not impossible, as a practical matter to achieve such a close fit between the ring and the tube portion 40. During the rolling operation of the threaded length 38, the metal is actually displaced, and the thread pitch diameter of the resulting threads are substantially equal to the original diameter of the tube, such as at 40' in FIG. 2. The thread crest diameter is of course greater than the original tube diameter, so the ring 42 is captive on the tube. Furthermore, the working of the metal tube during the thread rolling operation provides a threaded length of substantially greater strength than conventional machined threads.

The fitting shown in the drawings is commonly referred to as a transverse fitting, having a longitudinal portion 18 and a transverse portion 20. Such fittings are particularly useful in limited space applications, because the transverse portion 20 may be rotated to any desired angular position with the port 36. In assembling such a fitting, the threaded length 38 is engaged within the port 36, and transverse portion 20 is positioned with its end portion 22 facing in the desired direction for coupling to a suitable fluid pressure line (not shown). Lock nut 32 is then tightened down against sealing ring 42, urging the ring into fluid sealing contact between port 36 and the cylindrical tube surface 40, while the tube portion 20 is held against rotation.

In a straight fitting, employing only a longitudinal tube portion such as 18, there is no necessity that the fitting be capable of relative rotation within the port 36, as the outer end of the fitting will always be axially aligned with the port entrance. Thus such a fitting may be constructed with a lock nut portion similar to lock nut 30 shown in the drawings which is made integrally with tube 18. As the threads 38 are engaged in port 36, the inner transverse face of the integral lock nut will urge the ring 42 into fluid tight sealing engagement.

FIG. 1 shows a sealing ring 42' substantially trapezoidally shaped in cross section, with one of the non-parallel sides of the trapezoid extending at the same angle as the outwardly flared port entrance, assuring intimate contact in fluid tight relationship between the port entrance and the ring. In the remaining figures there is shown another ring configuration which has been found advantageous. Such ring is shown most clearly in FIGS. 6 and 7.

Referring first to FIG. 6, there is shown partially the fitting mounted in an universal, or as it is commonly referred to, a UN port. The UN port has a conical sealing seat 44 disposed at an angle of 30 degrees from the center line of the port. Inwardly of conical seat 44 is a cylindrical portion 46 of greater diameter than the crest diameter of the threads 38. Inwardly of the cylindrical portion 46 is an inclined face 48 which is at a 45 degree inclination with the port center line. The sealing ring 42 has a slightly longitudinally curved external surface adapted to sealingly engage the sealing seat 44. FIG. 4 shows the position of the ring prior to the tightening of lock nut 30 to provide a fluid tight seal. As can be seen, with the UN port, before tightening, the ring 42 contacts the sealing seat of the port only at the inner end thereof. As the nut 30 is tightened, the ring deforms slightly to the position shown in FIGS. 5 and 6 to assure a fluid tight seal. This deformation occurs in the outer end portion of the ring, the outer end spreading slightly under high torques, as can be seen by comparing FIG. 4 with FIGS. 5 and 6.

FIG. 7 is a partial view showing the relationship of ring and SAE standard port. The SAE port has a sealing seat 50 inclined at a 15 degree angle from the port center line, and an inner portion 52 between seat 40 and the port threads disposed at a 45 degree angle. Because of the smaller angle of the SAE port, there is initially a larger area of contact between the sealing ring 42 and the seat 50. Hence the ring deformation is very small in the SAE port. While the deformation is measurable under high torques, it is considerably less than in the UN port, and the ring 42 would appear substantially as shown in FIG. 7 under various conditions of torque.

In the manufacture of the sealing rings 42 and 42', the inner diameter of the ring is machined to a close tolerance to be received in sliding engagement over the cylindrical portion 40' of tube 18 as shown in FIG. 2. By holding both the ring and tube to close tolerances, an efficient fluid tight seal may be achieved therebetween with very little deformation of the ring when the fitting is tightened into the port.

When utilizing a sealing ring and tubular member having a very close fit therebetween, as above described, the radially inward movement of the ring 42 against the tube portion 40 is almost immeasurable to provide a fluid tight seal therebetween. Utilizing a ring which is swaged about the tube, the ring must be sufficiently deformable to be urged radially inwardly into sealing engagement after reception over the threaded tube end. Hence the instant construction permits the use of ring materials which are comparatively stronger but not as readily deformable as materials heretofore used in fittings wherein the ring is swaged about the tube. Materials such as high strength metal alloys, ceramics, etc. possess properties which make them admirably suited to high pressure, high temperature applications. However, such are also characteristically more brittle than metals heretofore used as sealing rings in fluid pressure fittings, and may fracture, break or otherwise deform if swaged about the tubular member. In the field of metal rings a number 7075–T6 high strength aluminum alloy has been found to work very satisfactorily. Such alloy is quite hard, and possesses high resistance to deformation and failure at elevated temperatures and pressures. Although relatively nonductile, it will deform slightly under torque to provide an efficient fluid seal in the type fittings above described. Other metals, and even ceramics possessing these characteristics of high strength and durability may be used, aluminum alloy being only one of the many possible materials.

What is claimed is:

1. That method of manufacturing a fluid pressure coupling for use in an internally threaded port having an outwardly flared entrance portion at its outer end comprising providing a metal tubular member having an externally threaded length spaced from its inner end and a lock nut threadedly engaged thereon and exhibiting a smooth cylindrical external surface adjacent to its inner end and of less external diameter than the threaded outer end thereof, forming a cylindrical continuous sealing ring of hard relatively inflexible and but slightly deformable material and having an inner surface adapted to closely conform to and but slightly greater in diameter than the external surface of the cylindrical tubular member adjacent to its inner end and having an external surface adapted to closely conform to and form intimate contact with the flared entrance portion of the port to sealingly engage the same, positioning said ring over the inner end of the member and advancing the ring thereover to a position thereon spaced from said inner end and adjacent said lock nut, and thereafter by deforming forming an externally threaded length on said member spaced inwardly of said ring for threaded engagement within said port and having a thread crest diameter exceeding the internal diameter of the sealing ring and the external diameter of that portion of the tubular member underlying the ring to secure said ring between said lock nut and said deformed threads.

2. That method of manufacturing a fluid pressure coupling for use in an internally threaded port having a flared countersunk sealing seat at its outer end as defined in claim 1 characterized in that following the placement of the sealing ring upon the inner end of the member and advancing the same thereover to a position thereon spaced from said inner end the externally threaded length formed on said member as defined in claim 1 is deformed by rolling external threads on the inner end of said cylindrical tubular member for engagement within said port, which threads have a thread crest diameter greater than the normal diameter of said end portion of the tube prior to threading and greater than the internal diameter of the sealing ring received upon the unthreaded portion of the tubular member.

References Cited

UNITED STATES PATENTS

| | | | |
|---|---|---|---|
| 2,064,342 | 12/1936 | England | 29—437 |
| 2,113,424 | 4/1938 | Crowther | 10—10 X |
| 2,113,425 | 4/1938 | Crowther | 10—10 X |
| 2,343,235 | 2/1944 | Bashark | 285—220 |
| 2,413,878 | 1/1947 | Maky | 285—220 |
| 2,987,811 | 6/1961 | Acres | 29—437 |
| 3,079,180 | 2/1963 | Lyon | 285—220 |
| 3,101,206 | 8/1963 | Franck | 285—220 |
| 3,163,196 | 12/1964 | Hanneman | 10—10 X |

CHARLIE T. MOON, *Primary Examiner.*

CARL W. TOMLIN, *Examiner.*

C. B. FAGAN, *Assistant Examiner.*